Oct. 20, 1925.
W. E. CRAWFORD
OIL GAUGE
Filed Aug. 19, 1921
1,558,240
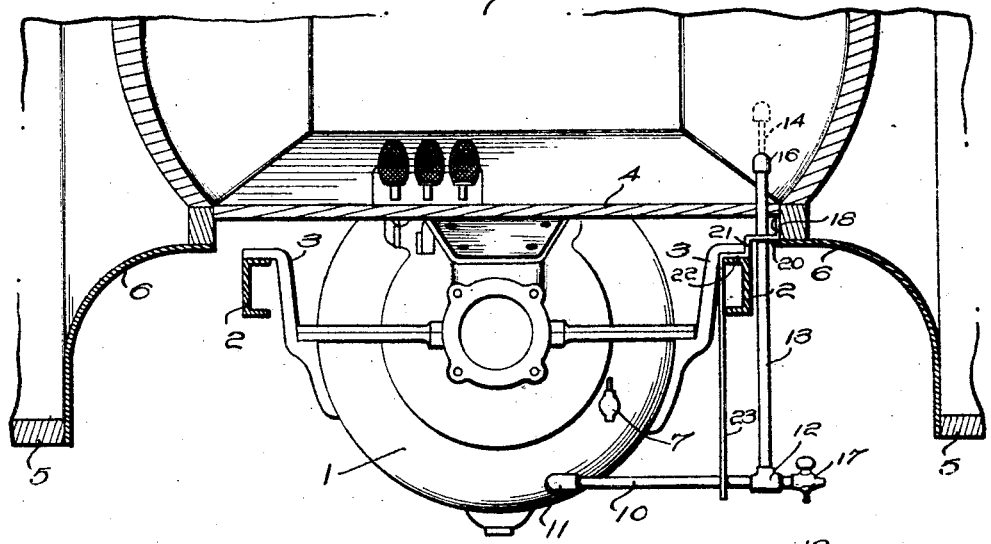
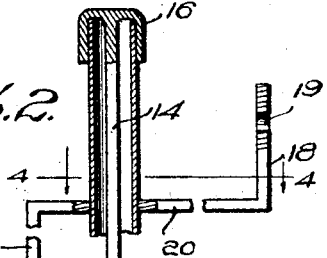
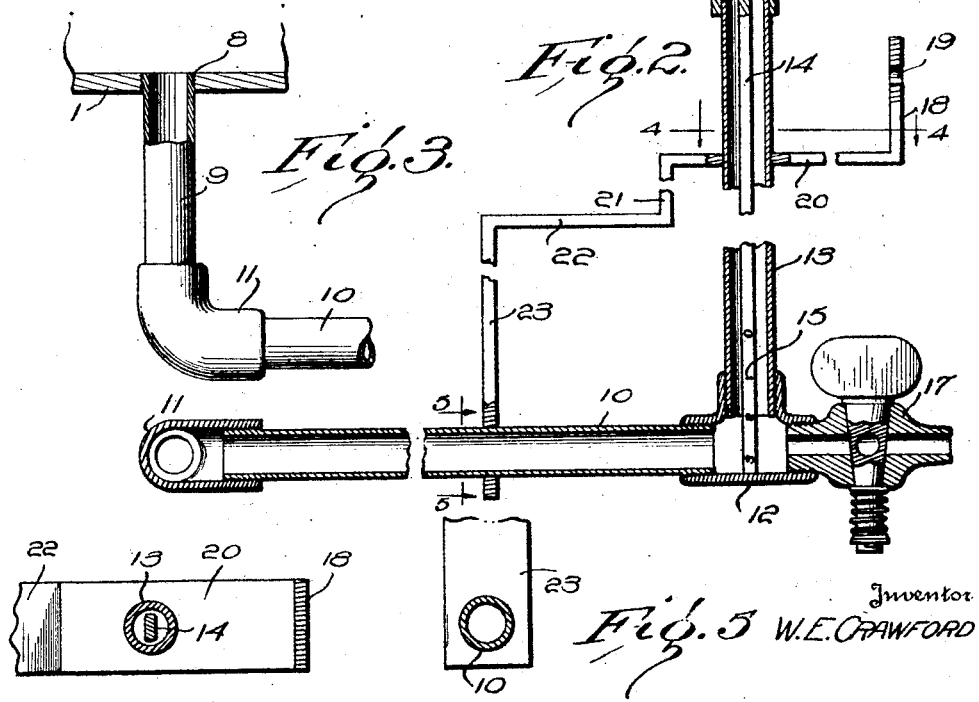

Patented Oct. 20, 1925.

1,558,240

UNITED STATES PATENT OFFICE.

WALTER EDWARD CRAWFORD, OF ORLANDO, FLORIDA.

OIL GAUGE.

Application filed August 19, 1921. Serial No. 493,686.

*To all whom it may concern:*

Be it known that I, WALTER E. CRAWFORD, a citizen of the United States, residing at Orlando, in the county of Orange and State of Florida, have invented certain new and useful Improvements in Oil Gauges, of which the following is a specification.

This invention relates to oil gauges for automobiles, and it comprises an attachment adapted to be connected to an existing opening in the crank case by means of which the level of oil in the crank case may be readily determined.

In a well known type of car in general use, the crank case is provided with a pair of pet cocks by means of which the oil level is determined. For proper lubrication of the working parts of the engine, a level of oil between the two pet cocks should be maintained. It is impossible to determine the level of oil without reaching under the body of the machine and opening the pet cocks, which is, at times, very inconveneint.

It has been proposed to connect a tube to the lower pet cock and extend the tube upwardly at an angle through the metal plate or splash between the body of the car and the running board. This tube is provided with a suitable gauge whereby the level of oil may be determined.

In the present invention, I provide an improvement over the gauge above described, by arranging a tube or pipe to extend horizontally from the lower pet cock opening and connect it to a vertically extending pipe passing through the floor of the car.

The present arrangement is advantageous in that it permits the level of oil to be read by the driver while seated in the car and at the same time, it connects the gauge to a rigid support whereby accurate readings will be obtained. When the gauge is supported by the splash arranged on the side of the car, accurate readings will not be obtained after it has been in use for a period of time as this plate sags and the position of the gauge would be changed.

By extending the pipe horizontally from the lower pet cock and connecting it to a vertically extending pipe, it is also possible to arrange a pet cock on the outer end of the horizontal pipe to permit the oil to be drained from the crank case when desired.

In the accompanying drawings, I have shown one embodiment of the invention. In this showing:

Figure 1 is a vertical sectional view of a portion of a motor vehicle showing the invention applied, Figure 2 is a detail view of the gauge removed, parts being shown in section, Figure 3 is a horizontal sectional view through the crank case showing the method of securing the gauge thereto, Figure 4 is a horizontal sectional view on line 4—4 of Figure 2, and, Figure 5 is a vertical sectional view on line 5—5 of Figure 2.

Referring to the drawings, the reference numeral 1 designates the crank case of a motor vehicle which is supported on longitudinal beams 2 by means of hangers 3. The floor of the body of the vehicle is shown at 4. The vehicle is provided with the usual running boards 5 and splash 6 connecting the running board and the body. In the type of vehicle to which the invention is to be applied, the crank case is provided with an upper pet cock 7. By opening the pet cock, it can be determined whether or not the level of oil in the crank case extends above it, and if the level of oil extends above the upper pet cock, an excess quantity of oil is present in the crank case. The crank case is further provided with a lower opening 8 which normally receives a pet cock similar to the pet cock 7 and an oil level is maintained above the lower pet cock opening.

In the present invention, the lower pet cock is removed and the section of pipe 9 is secured in the lower pet cock opening. This pipe is connected to a horizontal pipe 10 extending transversely of the machine by means of an elbow 11. A T connection 12 is arranged in the horizontal pipe 10 providing a connection to a vertical pipe 13 which extends through the floor of the car. An indicating member 14 is arranged in the vertical pipe, the indicating member being provided with suitable indicia 15 adjacent its lower end to indicate the level of oil in the pipe 13. The indicating member may be provided with a cap 16 which is internally threaded and adapted to engage external threads on the end of the vertical pipe. The usual pet cock 17 may be connected to the T joint 12 in alinement with the pipe 10.

A supporting member is secured to the body of the car and adapted to support the gauge. As shown, the supporting member comprises a vertical portion 18 having an opening 19 for the reception of a suitable fastening element adapted to be received in a portion of the car body. A horizontal portion 20 is connected to the vertical portion and is provided with an opening for the reception of the vertical pipe 13. Beyond the horizontal portion, the supporting member is offset, as at 21, and provided with a second horizontal portion 22, adapted to rest upon the longitudinal beam 2. The outer end of the supporting member extends downwardly, as at 23, and is provided with an opening for the reception of the pipe 10.

In the use of the device, the indicating plate 14 is removed from the pipe 13 and the level of oil determined by the height of a film of oil on the lower end of the indicating plate. The use of this device eliminates the necessity of reaching under the machine to open the pet cocks, and further eliminates the necessity of the driver getting out of the machine to read the oil level, as when the former type of gauge is employed. The arrangement whereby the gauge is supported on rigid parts of the machine further eliminates the possibility of inaccuracy due to a change in position of the gauge when the car is used. By arranging the pipe that extends from the crank case horizontally, the pet cock 17 may be employed to remove the oil from the crank case similar to the manner in which the lower pet cock is employed when no gauge is provided.

It is to be understood that the form of the invention herewith shown and described is to be taken as a preferred example of the same, and that various changes in the shape, size, and arrangement of parts may be resorted to without departing from the spirit of the invention or the scope of the subjoined claim.

I claim:

In an automobile having an engine crank case provided with an opening and a body having a floor, an oil gauge comprising a horizontal pipe having one end arranged in said opening, a vertical pipe connected to the other end of said horizontal pipe and extending through the floor of the body, an indicating member arranged in the vertical pipe and a depending supporting member secured to the body of the car, said member being provided with a horizontal portion having an opening for the reception of said vertical pipe, said member being extended downwardly beyond said horizontal portion and being provided with a second horizontal portion adapted to rest upon a portion of the frame of the car, said member being further provided with a depending end having an opening for the reception of said horizontal pipe.

In testimony whereof I affix my signature.

WALTER EDWARD CRAWFORD.